United States Patent [19]

Al-Dhahir et al.

[11] Patent Number: 5,708,966
[45] Date of Patent: Jan. 13, 1998

[54] METHOD AND APPARATUS FOR PERFORMING POWER CONTROL USING THE WIDE-BAND SYNCHRONIZATION

[75] Inventors: Naofal Mohammed Wassel Al-Dhahir, Niskayuna; Gary Jude Saulnier, Rexford; John Erik Hershey, Ballston Lake, all of N.Y.

[73] Assignee: Lockheed Martin Corporation, King of Prussia, Pa.

[21] Appl. No.: 644,643

[22] Filed: Apr. 4, 1996

[51] Int. Cl.⁶ .................................................. H04B 7/185
[52] U.S. Cl. ........................ 455/13.4; 455/52.2; 455/69
[58] Field of Search ............................... 455/9, 11.1, 12.1, 455/13.4, 20, 54.1, 52.1, 52.2, 63, 65, 67.1, 67.3, 69, 70; 370/315–318

[56] References Cited

U.S. PATENT DOCUMENTS

| | | | |
|---|---|---|---|
| 4,910,792 | 3/1990 | Takahata et al. | 455/69 |
| 4,941,199 | 7/1990 | Saam | 455/52.2 |
| 5,060,292 | 10/1991 | Ayukawa et al. | 455/52.2 |

*Primary Examiner*—Nguyen T. Vo
*Attorney, Agent, or Firm*—W. H. Meise; G. H. Krauss; S. A. Young

[57] ABSTRACT

A communications system includes first and second ground stations and a spacecraft repeater. Data signals are transmitted between ground stations by way of the repeater, together with spread-spectrum ranging signals. Uplink rain attenuation is compensated for changing the transmitted power at the ground stations. The amount of downlink attenuation is determined by measuring the total carrier-to-noise ratio in three paths, station 1 to station 2, station 2 to station 1, and station 1 to station 1. With these three values of total attenuation, the two downlink attenuations and the number of active signals traversing the repeater can be determined. The downlink attenuations are converted to uplink attenuations, and used to control the transmitters.

4 Claims, 3 Drawing Sheets

METHOD AND APPARATUS FOR PERFORMING POWER CONTROL USING THE WIDE-BAND SYNCHRONIZATION

FIELD OF THE INVENTION

This invention relates to communications systems, and more particularly to communications systems which use a spacecraft repeater for distributing signals to plural ground stations in the presence of rain and a variable number of active signals traversing the repeater.

BACKGROUND OF THE INVENTION

Many communications systems use spacecraft repeaters or transponders, including those of the "bent pipe" type, in which many ground stations transmit signals to the spacecraft, which repeats the signal, and transmits the repeated signals back toward the ground stations. Such systems allow high data rates to be achieved between widely separated ground stations, without any transmission lines extending therebetween. In order to effectively separate the uplink signals from the downlink signals, the spacecraft repeater ordinarily receives the uplink signals in a relatively high frequency band, and converts the signals to a lower frequency range for repeating.

It often happens that rain occurs in portions of the uplink or downlink, which tends to attenuate the signals traversing the paths between the ground stations and the spacecraft. This attenuation has the effect of degrading the signals transmitted through the system as a whole, that is to say from one ground station to another. When the signal is data, the presence of attenuation may result in errors, and when the signal represents voice or pictures, the reduced signal amplitude may result in poorly audible voice, or grainy, noisy pictures. Various schemes are used in the prior art to handle this problem. The simplest scheme is to provide ample signal power or amplitude margin. While effective, this tends to waste resources, because more power is transmitted than is required under most conditions. Another scheme involves sending a reference-power beacon signal from the spacecraft to the ground stations, whereupon the ground stations can determine the downlink attenuation. A beacon signal may not be available. The weight of a beacon signal generator and antenna may be greater than is allowable on the spacecraft, or if available, may be in the wrong frequency range, or may be used exclusively for spacecraft control.

Improved communications systems are desired.

SUMMARY OF THE INVENTION

A communication system includes a spacecraft repeater for receiving signals within a first frequency range, for converting the signals to a second frequency range, and for retransmitting signals at the second frequency, and also includes a plurality of ground stations, each of which transmits signals to the spacecraft by way of an uplink, and receives signals from the spacecraft by way of a downlink. A first ground station of the plurality of ground stations transmits a first reference signal with a calibrated characteristic, and a second ground station of the plurality of ground stations transmits a second reference signal, also with a calibrated characteristic. A receiving arrangement is associated with the first ground station, for receiving the first reference signal retransmitted at the second frequency by the spacecraft, and for receiving the second reference signal at the second frequency retransmitted by the spacecraft. A receiving arrangement is associated with the second ground station, for receiving the first reference signal retransmitted at the second frequency by the spacecraft. A first carrier-to-noise ratio determining arrangement is coupled to the first ground station for determining the total carrier-to-noise ratio of the first reference signal retransmitted by the spacecraft, to thereby determine a first-to-first signal carrier-to-noise ratio. A second carrier-to-noise ratio determining arrangement is coupled to the second ground station for determining the total carrier-to-noise ratio of the first reference signal retransmitted by the spacecraft, to thereby determine a first-to-second signal carrier-to-noise ratio. A third carrier-to-noise ratio determining arrangement is coupled to the first ground station for determining the total carrier-to-noise ratio of the second reference signal retransmitted by the spacecraft, to thereby determine a second-to-first signal carrier-to-noise ratio. A processor is coupled to the first ground station for receiving the first-to-first signal carrier-to-noise ratio, the first-to-second signal carrier-to-noise ratio, and the second-to-first signal carrier-to-noise ratio, and for determining downlink rain attenuation on the first and second downlinks and the number of active signals repeated by the spacecraft. A controller is coupled to the first and second ground stations, for controlling the transmitted power of data signals transmitted to the spacecraft in response to the downlink rain attenuation and the number of active signals. The processor solves three simultaneous equations with three unknowns.

A method for controlling the uplink power transmitted by each of a pair of ground stations to a spacecraft repeater in the presence of rain and a variable number of active signals traversing the repeater includes the step of transmitting first data signals and first reference signals from a first ground station to the spacecraft by way of a first uplink, whereby the repeater repeats the first data and first reference signals at a downlink frequency. The method further includes the step of transmitting second data signals and second reference signals from a second ground station to the spacecraft by way of a second uplink, whereby the repeater repeats the second data and reference signals at a downlink frequency. The repeated first and second reference signals are received at the first ground station, and the repeated first reference signals are received at the second ground station. At (or for) the first ground station, the total carrier-to-noise ratio of the first and second reference signals is determined. At (or for) the second ground station, the total carrier-to-noise ratio of the first reference signals is determined. From the total carrier-to-noise ratio of the first and second reference signals, the total number of active signals traversing the repeater is determined, as well as the uplink rain attenuation of both first and second uplinks. First and second control signals are generated from the uplink rain attenuation determined for the first and second uplinks, respectively. The first and second control signals are applied to control the transmitted power of the first and second data signals, respectively, in a manner which tends to compensate for the uplink attenuation. In the case in which either the first or second reference signals (or both) are digitally modulated, the measurement of total carrier-to-noise ratio is performed by determining the bit error rate.

DESCRIPTION OF THE INVENTION

Figure 1:
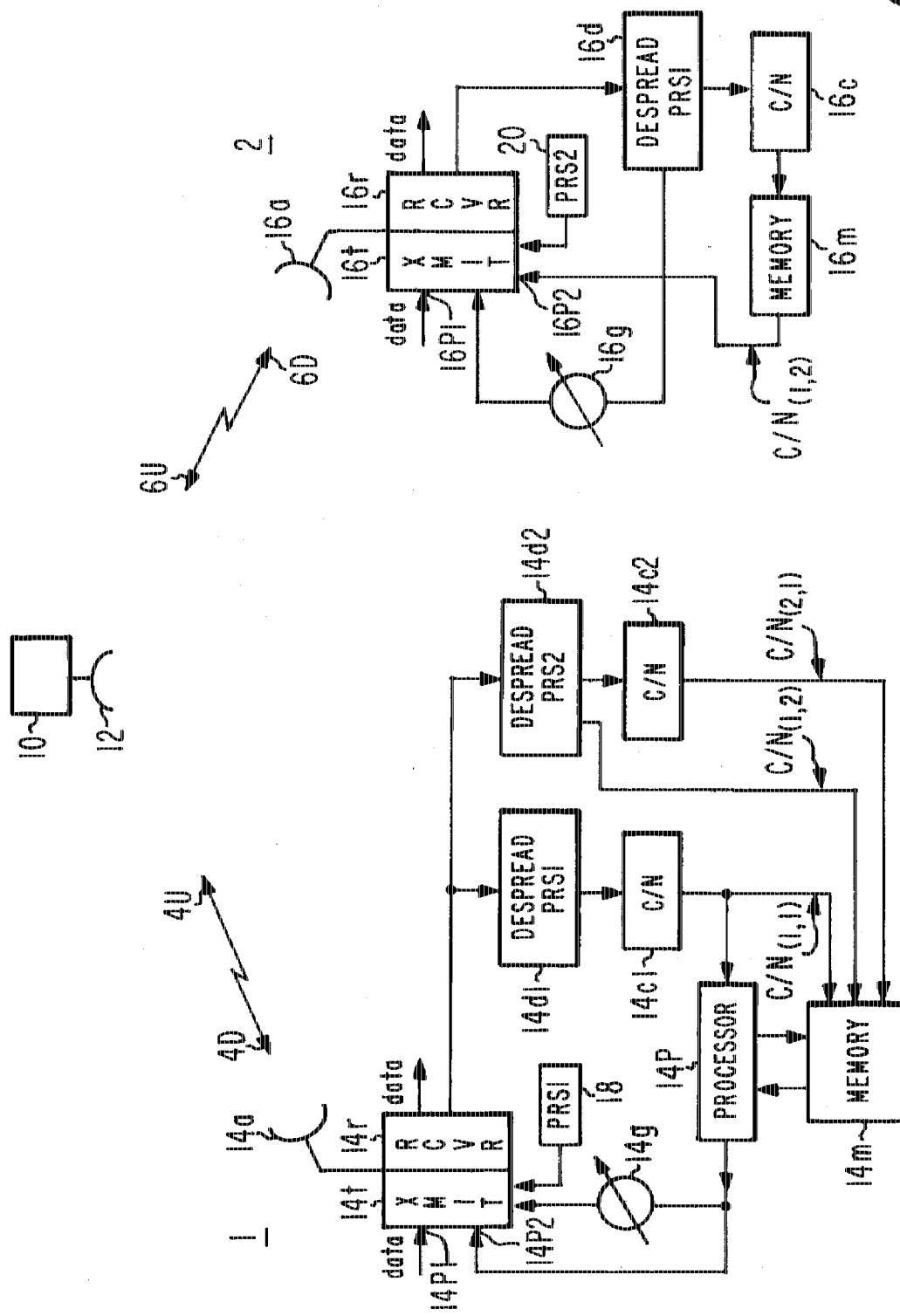
FIG. 1 is a simplified block diagram illustrating a plurality of ground stations communicating with each other by way of a spacecraft repeater.

FIG. 1 is a simplified block diagram of a communication system according to the invention. In FIG. 1, a spacecraft repeater 10 includes a transmit-receive antenna 12. Spacecraft repeater 10 has a relatively broad bandwidth. A first ground station 1 and a second ground station 2 communicate with each other, and possibly with other ground stations, by way of uplinks to, and downlinks from, spacecraft repeater 10. Ground station 1 includes an antenna 14a connected to a transmitter (XMIT) 14t and a receiver (RCVR) 14r. Transmitter 14t transmits data received at a data input port 14p1 in TDMA form. The transmissions of data in TDMA form are made within a relatively narrow band, so that several such channels may be accommodated by the relatively wideband spacecraft repeater channel. Transmitter 14t also transmits data received at a second data input port 14p2 by modulation onto a spread-spectrum ranging signal. The spreading code for the ranging signal portion of the transmissions of transmitter 14t is provided by a first pseudorandom signal (PRS1) generator 18. The spectrum of the ranging signal after modulation by the spreading sequence extends over a bandwidth greater than the bandwidth of the TDMA data, and which desirably is as broad as the full bandwidth of the spacecraft repeater 10. Receiver 14r receives signals from antenna 14a which are transmitted over downlink 4D from spacecraft repeater 10, and makes the TDMA data available to a data sink, not illustrated. Ground station 1 further includes a first and second despreaders or demodulators 14d1 and 14d2. Despreader 14d1 despreads signals encoded with spreading code PRS1, while despreader 14d2 despreads signals encoded with a spreading code PRS2. The despread signals from despreader 14d1 are applied to a carrier-to-noise (C/N) determining arrangement illustrated as a block 14c1, and the despread signals from despreader 14d2 are applied to a carrier-to-noise determining arrangement 14c2. Thus, C/N arrangement 14c1 operates to determine the carrier-to-noise ratio of the ranging signal which was encoded with PRS1 at ground station 1, while C/N arrangement 14c2 operates to determine the carrier-to-noise ratio of the ranging signal which was encoded with PRS2 at ground station 2. The carrier-to-noise information is coupled from C/N 14c1 to a memory 14m and a processor 14p. The carrier-to-noise information is coupled from C/N 14c2 to memory 14m. Processor 14P interacts with memory 14m and with the input signals from C/N 14c1 to produce an uplink rain attenuation signal representing uplink rain attenuation for station 2 (i.e. on uplink 6U), which attenuation signal is applied to the spread-spectrum or ranging signal data input port 14p2 Of transmitter 14t, and to a transmitter power control illustrated as an attenuator 14g. (XMIT) 16t, which receives data at its first data input port 16p1 from a data source (not illustrated) and modulates the data in time division multiple access (TDMA) form for transmission over uplink 6U to spacecraft repeater 10. The transmissions of data in TDMA form are made within a relatively narrow band, so that several such channels may be accommodated by the relatively wideband spacecraft repeater channel. Transmitter 16t also includes a second data input port 16p2, and includes the data in the ranging signal. The ranging signal is spread by a spreading code PRS2 produced by a block 20. Ground station 2 also includes a receiver 16r, which receives signals from antenna 16a which are transmitted over a downlink 6D from spacecraft repeater 10, and makes the data available to a data sink, not illustrated. Receiver 16r of ground station 2 is coupled to a spread-spectrum demodulator or despreader 16d, which despreads the ranging signal encoded with PRS1 which originates from ground station 1, separates out the uplink 6U rain attenuation signal, and makes the uplink 6U rain attenuation signal available to attenuator 16g for control of the uplink power transmitted by transmitter 16t. A C/N arrangement illustrated as a block 16c extracts the total carrier signal-to-noise ratio of the signal received from downlink 6D, and stores the value in memory 16m. The "total" carrier-to-noise ratio for this purpose is defined as the ratio for a carrier transmitted from ground station 1 to the spacecraft over uplink 4U, includes any noise addition in the spacecraft transponder, and includes the attenuation of downlink 6D. Since the ranging signal on which the C/N measurement is made in block 16c originated with ground station 1, and is being measured in ground station 2, it may be termed the "one-to-two" or "1-2" C/N ratio. The value of the 1-2 carrier-to-noise ratio is coupled from memory 16m to data input port 16p2 of transmitter 16t for modulation onto ranging signals transmitted by transmitter 16t.

In operation of the arrangement of FIG. 1, transmitter 14t of ground station 1 transmits its ranging signals with amplitude or total power which is controlled by attenuator 14g. Ideally, the ranging signals are transmitted with constant power. The TDMA data signals are transmitted at a greater power level than the ranging signals in their narrow band, but changes in the setting of attenuator 14g affect both the ranging signal and the TDMA signal level by the same amount, measured in dB. The ranging signals transmitted by ground station 1 are encoded with data representing changes in the attenuation of uplink 6U from the clear-sky condition, determined as described below, so ground station 2 "knows" the uplink attenuation change as soon as it despreads the PRS1 signal which it receives (by way of spacecraft repeater 10) from ground station 1. Ground station 2 adjusts its attenuator 16g in an amount equal to the magnitude of the uplink 6U attenuation change signal, which compensates for any changes which occur in uplink attenuation. Thus, the ranging signal arriving at spacecraft 10 from uplink 6U is ideally invariant in its amplitude.

Ground station 2 of FIG. 1 also determines, in C/N block 16c, the carrier-to-noise ratio of the PRS1 signal despread by despreader 16d. The value of C/N is applied to memory 16m for temporary storage therein. The current value of the C/N memory information is applied to input port 16p2, is modulated with the PRS2 spreading code, and transmitted (by way of spacecraft repeater 10) to master ground station 1.

Ground station 1 of FIG. 1 despreads the PRS2 encoded signal in block 14d2, and performs C/N measurement in block 14c2. The C/N determined in block 14c2 is that of the PRS2-encoded information originally transmitted by ground station 2, so the C/N represents the ground station 2 to ground station 1 carrier-to-noise ratio, or the "2-1" C/N. The 2-1 C/N is applied from block 14c2 of FIG. 1 to memory 14m for temporary storage therein.

At the same time that the 1-2 and 2-1 C/Ns are being determined and stored, master ground station 14 of FIG. 1 receives its own transmitted ranging signal as a return signal on downlink 4D. As noted above, the station 1 ranging signal is encoded with PRS1. Despreader 14d1 of ground station 1 despreads the signal using PRS1, and applies it to C/N determining arrangement 14c1. The output of C/N measuring block 14c1 thus represents the "1-1" carrier-to-noise ratio, and is applied to processor 14P and to memory 14m.

It might appear to be easy to determine the link attenuations so as to compensate for the effects of rain attenuation.

However, one of the characteristics of the amplifiers and processors which are used in the spacecraft repeater is that the available power is distributed among the active signals which at any moment traverse the channel. Thus, if a single signal is for a moment utilizing the spacecraft repeater channel, all the available power will, in principle, be applied to that single signal, whereas if a plurality of signals are traversing the repeater channel, the available power will be divided among them. Thus, if the number of signals availing themselves of the repeater channel doubles, the power of each decreases by 3 dB. Consequently, unless the number of users is known or estimated, no conclusion can be drawn as to attenuation of the signal paths.

Figure 3A:
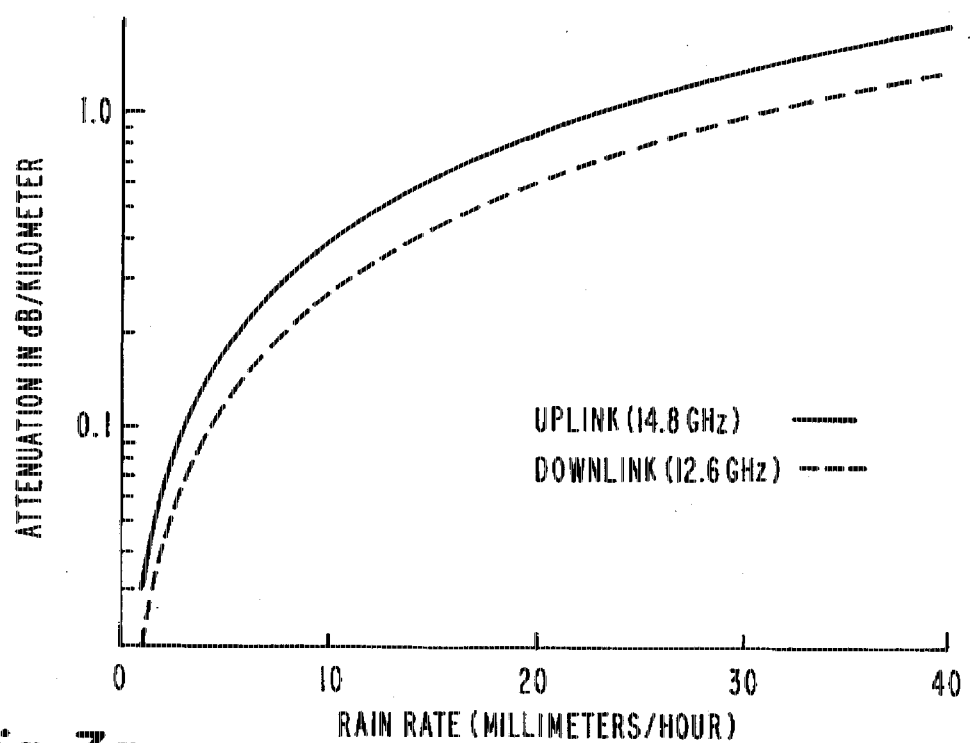
FIG. 3a illustrates plots of uplink and downlink rain attenuation, and FIG. 3b plots the ratio therebetween.
Figure 3B:
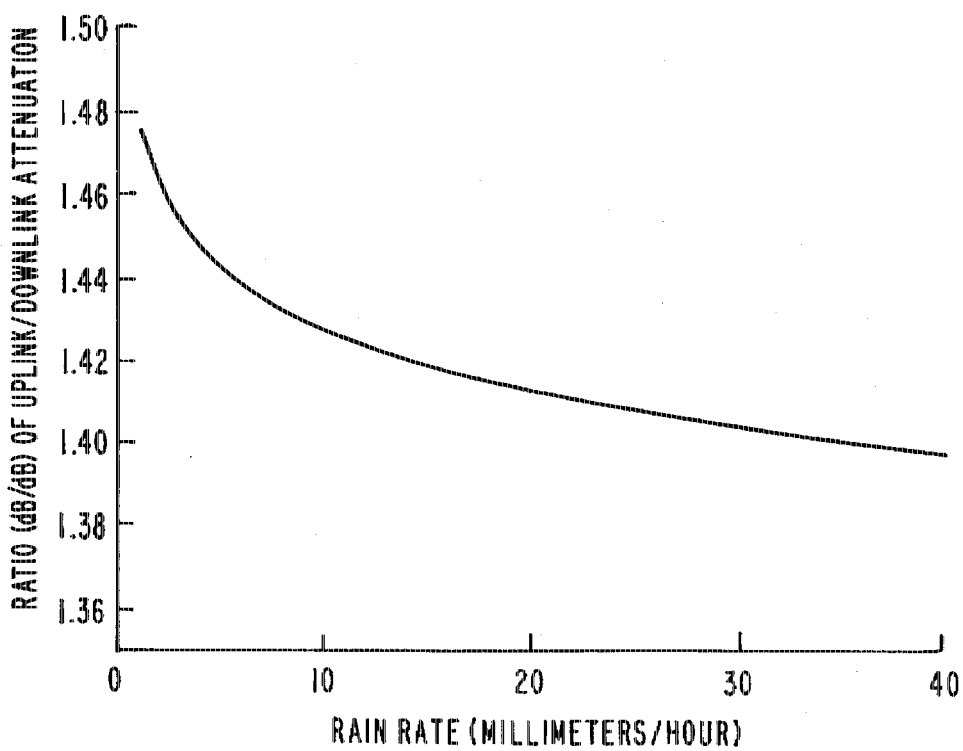

Another factor which enters into the determination of rain attenuation is the fact that the uplink and downlink relating to any particular ground station are at different frequencies. FIG. 3a illustrates plots of attenuation in dB versus rain rate in millimeters per hour for a 14.8 GHz uplink (solid line) and for a 12.6 GHz downlink (dotted line). As it happens, there is an approximately constant ratio (measured in dB) between the uplink and downlink attenuation, which is plotted in FIG. 3b and expressed in equation (2.5) below. As can be seen from FIG. 3b, the ratio is about 1.4 dB regardless of the rain rate.

According to an aspect of the invention, the carrier-to-noise ratio CNR for the ith (i=1,2) uplink is given by $$\left(\frac{C}{N_o}\right)_{iU} = \frac{EIRP_i \left(\frac{G}{T}\right)_{sat.}}{kL_{U,i}K_{tot-U,i}} \stackrel{def}{=} \frac{\beta_i}{L_{D,i}} \quad (1)$$

where EIRP is the effective isotropic radiated power of the ith station, $(G/T)_{sat}$ is the ratio of antenna gain to satellite receiver noise temperature, $L_{u,i}$ and $L_{D,i}$ are the uplink and downlink rain attenuation, respectively, k is Boltzmann's constant, $L_{tot-U,i}$ accounts for all uplink losses other than rain, and $$\beta_i = \frac{EIRP_i \left(\frac{G}{T}\right)_{sat.}}{kL_{tot-U,i} \left(\frac{fU}{fD}\right)^{1.72}} \quad (2)$$

assuming, as set forth above, that $$L_{U,i} = L_{D,i} \left(\frac{fU}{fD}\right)^{1.72} \quad (3)$$

Similarly, the CNR for the jth downlink is given by $$\left(\frac{C}{N_o}\right)_{jD} = \frac{EIRP_{sat} \cdot \left(\frac{G}{T}\right)_j}{BO \cdot kN_c L_{tot-D,j} L_{D,j}} \stackrel{def}{=} \frac{\gamma_j}{N_c L_{D,j}} \quad (4)$$

where BO denotes the output backoff of the satellite amplifier, $N_c$ is the number of signals traversing the spacecraft transponder, $L_{tot-D,j}$ accounts for all downlink losses other than rain, and $$\gamma_j = \frac{EIRP_{sat} \left(\frac{G}{T_j}\right)}{BO \cdot k \cdot L_{tot-D,j}} \quad (5)$$

The total CNR is therefore equal to $$\left(\frac{C}{N_o}\right)_{tot}^{i-j} = \left(\left(\left(\frac{C}{N_o}\right)_{iU}\right)^{-1} + \left(\left(\frac{C}{N_o}\right)_{jD}\right)^{-1}\right)^{-1} = \frac{\beta_i \gamma_j}{L_{D,j}\gamma_j + N_c \beta_i L_{D,j}} \quad (6)$$

In FIG. 1, the station 1 to station loopback of the ranging signal provides a total CNR of $$\left(\frac{C}{N_o}\right)_{tot}^{1-1} = \frac{\beta_1 \gamma_1}{L_{D,1}(\gamma_1 + N_c \beta_1)} \quad (7)$$

the station 1 to station 2 path provides a total CNR of $$\left(\frac{C}{N_o}\right)_{tot}^{1-2} = \frac{\beta_1 \gamma_2}{L_{D,1}\gamma_2 + N_c \beta_1 L_{D,2}} \quad (8)$$

and the station 2 to station 1 path provides a total CNR of $$\left(\frac{C}{N_o}\right)_{tot}^{2-1} = \frac{\beta_2 \gamma_1}{L_{D,2}\gamma_1 + N_c \beta_2 L_{D,1}} \quad (9)$$

According to an aspect of the invention, these three equations are solved simultaneously to estimate three unknowns, namely $L_{D,1}$, $L_{D,2}$, and $N_s$, which correspond to the first and second downlink rain attenuation and the number of signals traversing the transponder, respectively. Once these unknowns are estimated, they may be used to estimate the corresponding uplink attenuation, and the uplink power may be adjusted to compensate for the estimated uplink attenuation in each path.

Figure 2:
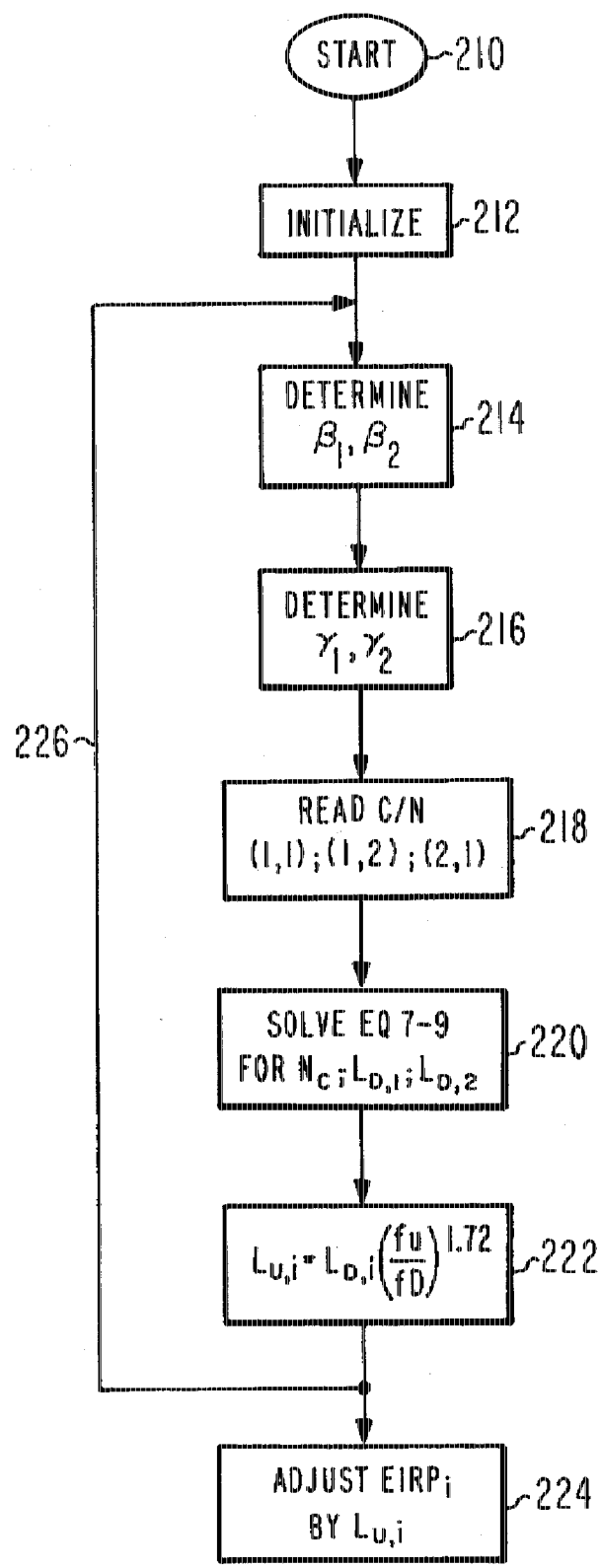
FIG. 2 is a simplified flow chart illustrating the logic flow in the processing of the arrangement of FIG. 1.

FIG. 2 is a simplified flow chart illustrating the processing which is performed in processor 14P of FIG. 1 to estimate the uplink attenuation. In FIG. 2, the logic starts at a START block 210, and flows to a block 212 which represents initialization of the fixed values of $(G/T)_{sat}$, $EIRP_i$, and k, and also represents the assignment of initial values to variables $EIRP_{1,2}, \ldots, (G/T)_{sat}, L_{D,1}, L_{U,2}, L_{tot-U,1}, L_{tot-U,2}$, and $N_c$. From block 212, the logic flows to a loop including blocks 214 through 222 and a loop-back logic block 226, and thereafter flows continuously around the loop. Block 214 represents calculation of $\beta_1$ and $\beta_2$ by the use of equation (2), for use in block 220. Block 216 represents the calculation of $\gamma_1$ and $\gamma_2$, also for use in block 220. From block 216, the logic flows to a block 218, which represents the reading of the three measured carrier-to-noise ratios, namely $C/N_{1,1}$, $C/N_{1,2}$, and $C/N_{2,1}$. Block 220 represents the solving of equations (7) through (9) to determine the three unknowns, which are the number of active signals and the two downlink losses. However, the control of transmitted power by the earth stations requires a knowledge of the uplink losses, rather than of the downlink losses. Block 222 represents conversion of the value of the downlink loss to uplink loss using the known ratio therebetween. Once the uplink losses are known, the values are returned to block 214 to begin another loop, and are also applied to a block 224, which represents the correction of attenuation at ground station 1, and the transmission of the appropriate value to ground station 2 so that it can perform its own attenuation correction.

Thus, a communication system according to an aspect of the invention includes a spacecraft repeater (10) for receiving signals within a first frequency range, for converting the signals to a second frequency range, and for retransmitting signals at the second frequency, and also includes a plurality of ground stations (14, 16), each of which transmits signals to the spacecraft by way of an uplink (4U, 6U), and receives signals from the spacecraft by way of a downlink (4D, 6D). A first ground station (14) of the plurality of ground stations transmits a first reference signal (first ranging signal) with a calibrated characteristic, and a second ground station (16) of the plurality of ground stations transmits a second reference signal (second ranging signal), also with a calibrated characteristic. A receiving arrangement (14r) is associated with the first ground station (14), for receiving the first reference signal (first ranging signal) retransmitted at the second frequency by the spacecraft repeater (10), and for receiving the second reference signal (second ranging signal) at the second frequency retransmitted by the spacecraft (10). A receiving arrangement (16r) is associated with the second ground station (16), for receiving the first reference signal (first ranging signal) retransmitted at the second frequency by the spacecraft (10). A first carrier-to-noise ratio determining arrangement (14d) is coupled to the first ground station (14) for determining the total carrier-to-noise ratio of the first reference signal (first ranging signal) retransmitted by the spacecraft, to thereby determine a first-to-first signal carrier-to-noise ratio. A second carrier-to-noise ratio determining arrangement (16d) is coupled to the second ground station for determining the total carrier-to-noise ratio of the first reference signal (first ranging signal) retransmitted by the spacecraft (10), to thereby determine a first-to-second signal carrier-to-noise ratio. A third carrier-to-noise ratio determining arrangement is coupled to the first ground station for determining the total carrier-to-noise ratio of the second reference signal retransmitted by the spacecraft, to thereby determine a second-to-first signal carrier-to-noise ratio. A processor is coupled to the first ground station for receiving the first-to-first signal carrier-to-noise ratio, the first-to-second signal carrier-to-noise ratio, and the second-to-first signal carrier-to-noise ratio, and for determining downlink rain attenuation on the first and second downlinks and the number of active signals repeated by the spacecraft. A controller is coupled to the first and second ground stations, for controlling the transmitted power of data signals transmitted to the spacecraft in response to the downlink rain attenuation and the number of active signals. The processor solves three simultaneous equations with three unknowns.

What is claimed is:

1. A communication system, comprising:
   a spacecraft repeater for receiving signals within a first frequency range, for converting said signals to a second frequency range, and for retransmitting signals at a second frequency;
   a plurality of ground stations for transmitting signals to said spacecraft repeater, and for receiving signals from said spacecraft repeater, a first ground station of said plurality of ground stations transmitting a first signal with a calibrated characteristic, and a second ground station of said plurality of ground stations transmitting a second signal, also with a calibrated characteristic;
   receiving means associated with said first ground station, for receiving said first signal retransmitted at said second frequency by said spacecraft repeater, and for receiving said second signal at said second frequency retransmitted by said spacecraft repeater;
   receiving means associated with said second ground station, for receiving said first signal retransmitted at said second frequency by said spacecraft repeater;
   first carrier-to-noise ratio determining means coupled to said first ground station for determining the total carrier-to-noise ratio of said first signal, to thereby determine a first-to-first signal carrier-to-noise ratio;
   second carrier-to-noise ratio determining means coupled to said second ground station for determining the total carrier-to-noise ratio of said first signal, to thereby determine a first-to-second signal carrier-to-noise ratio;
   third carrier-to-noise ratio determining means coupled to said first ground station for determining the total carrier-to-noise ratio of said second signal, to thereby determine a second-to-first signal carrier-to-noise ratio;
   processing means coupled to said first ground station for receiving said first-to-first signal carrier-to-noise ratio, said first-to-second signal carrier-to-noise ratio, and said second-to-first signal carrier-to-noise ratio, and for determining downlink rain attenuation on first and second downlinks and the number of active signals repeated by said spacecraft repeater; and
   control means coupled to said first and second ground stations, for controlling the transmitted power of data signals transmitted to said spacecraft repeater.

2. A system according to claim 1, wherein said processing means comprises:
   means for solving three simultaneous equations.

3. A method for controlling the uplink power of a pair of ground stations to a spacecraft repeater in the presence of rain and a variable number of active signals traversing said repeater, said method comprising the steps of:
   transmitting first data signals and first reference signals from a first ground station to said spacecraft repeater, whereby said repeater repeats said first data and first reference signals at a downlink frequency;
   transmitting second data signals and second reference signals from a second ground station to said spacecraft repeater, whereby said repeater repeats said second data and reference signals at a downlink frequency;
   receiving said repeated first and second reference signals at said first ground station;
   receiving said repeated first reference signals at said second ground station;
   at said first ground station, determining the total carrier-to-noise ratio of said first and second reference signals;
   at said second ground station, determining the total carrier-to-noise ratio of said first reference signals;
   from said total carrier-to-noise ratio of said first and second reference signals determine at said first and second ground stations, determining the total number of active signals traversing said repeater and the uplink rain attenuation of both first and second uplinks, and generating first and second control signals from said uplink rain attenuation of said first and second uplinks, respectively; and
   applying said first and second control signals to control the transmitted power of said first and second data signals, respectively, in a manner which tends to compensate for said uplink attenuation.

4. A method according to claim 3, wherein said first and second reference signals are digitally modulated, and said determining of total carrier-to-noise ratio is performed by determining the bit error rate.

* * * * *